Figure 1:
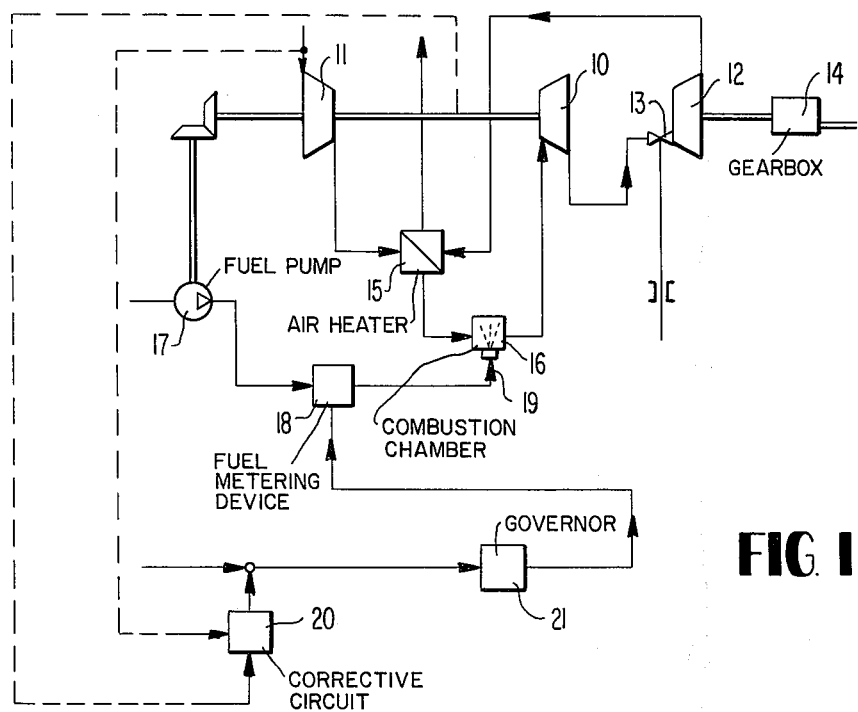

United States Patent
Greune et al.

[11] 3,886,731
[45] June 3, 1975

[54] GOVERNING DEVICE FOR A GAS TURBINE SYSTEM

[75] Inventors: Christian Greune, Furstenfeldbruck; Friedrich Hackl, Neu-Esting, both of Germany

[73] Assignee: Motoren-und Turbinen-Union Munchen GmbH, Germany

[22] Filed: Dec. 22, 1972

[21] Appl. No.: 317,776

[30] Foreign Application Priority Data
Dec. 22, 1971  Germany............................ 2163804

[52] U.S. Cl. .......................................... 60/39.28 T
[51] Int. Cl. ............................................. F02c 9/08
[58] Field of Search ................ 60/39.28 T, 39.28 R

[56] References Cited
UNITED STATES PATENTS

| | | | |
|---|---|---|---|
| 2,948,114 | 8/1960 | Beslier............................ | 60/39.28 T |
| 3,045,426 | 7/1962 | Brahm............................ | 60/39.28 T |
| 3,076,312 | 2/1963 | Haigh............................. | 60/39.28 T |
| 3,128,603 | 4/1964 | Haigh............................. | 60/39.28 T |

Primary Examiner—Clarence R. Gordon
Attorney, Agent, or Firm—Craig & Antonelli

[57] ABSTRACT

Governing device for a gas turbine system having a speed governor using the speed of a turbine in this system as a regulating variable for varying the fuel flow, characterized in that said speed (N) is automatically variable as a function of the inlet temperature ($T_1$) of the gas turbine system.

8 Claims, 3 Drawing Figures

GOVERNING DEVICE FOR A GAS TURBINE SYSTEM

Governing devices used on gas turbine engines for varying the fuel flow predominantly employ the rotational speed of a turbine in the gas turbine engine as a regulating variable.

The present invention relates to a governing device for a gas turbine system having a speed governor using the speed of a turbine in this system as a regulating variable for varying the fuel flow. The gas turbine system is exemplified by a vehicular or aircraft engine.

It is nevertheless realized that the power developed by the gas turbine system at a constant turbine speed or power lever angle, or that the thrust developed by said engine at such speed or power lever angle, varies in large measure with the inlet temperature of the gas turbine system or engine. A broad object of the present invention therefore is to alleviate or eliminate this disadvantage.

It is a particular object of the present invention to provide a governing device for automatically varying the engine speed as a function of the said inlet temperature. The manner in which this speed can be effected or varied by this temperature essentially depends on the particular type of gas turbine system or engine employed; namely, whether the system or engine is of fixed or variable geometry, and on the particular requirements imposed on the operating performance of the gas turbine system.

In certain instances where maximum consistency of performance in the power lever angle range between idling and maximum is often an important consideration, the particular practice is to make the speed automatically variable, over all power lever angles of the speed or fuel flow governor or over the entire range of said speed, by a function which is dependent on said inlet temperature and made to suit the operating mode of the said turbine.

In many applications it will prove effectual and sufficient to make this speed automatically variable over all power lever angles of the speed or fuel governor or over the entire range of said speed proportionally to the root of said inlet temperature. For example, in the case of fixed-geometry aircraft engines, this will produce thrust which is wholly independent of the outside temperature. In the case of a vehicular variable-geometry engine, such as one which may have a variable stator nozzle in a power turbine, the output not only varies with the outside temperature but also varies with the adjusted position of this stator nozzle, that is, with the throttling action on the gas generator upstream of the power turbine. Yet, also engines like these show a drastic reduction in the impact of outside temperature on output by automatically varying the said speed proportionally to the root of said inlet temperature to assist effectual control of the variable stator nozzle. This holds analogously for variable-geometry aircraft engines and stationary gas turbine systems.

Apart from the requirement for at least approximately consistent output or at least approximately consistent thrust in said power or speed range at said variable inlet temperature, it often becomes necessary to limit a characteristic quantity of the gas turbine system or engine. In a further aspect of the present invention, the maximum value of said speed is therefore made variable, while allowing for a specified limit of a characteristic quantity of the gas turbine system, by a function which is dependent on said inlet temperature. This characteristic quantity is exemplified by the output, the inlet temperature of a turbine or a pressure ratio of the gas turbine system. It will in most cases be sufficient when the maximum value of said speed is made automatically variable proportionally to said inlet temperature. The limitation, for example of said output, is important on cold days. In a further aspect of the present invention said automatic variability of the maximum value of said speed is present only below a certain low level of said inlet temperature.

Figure 2:
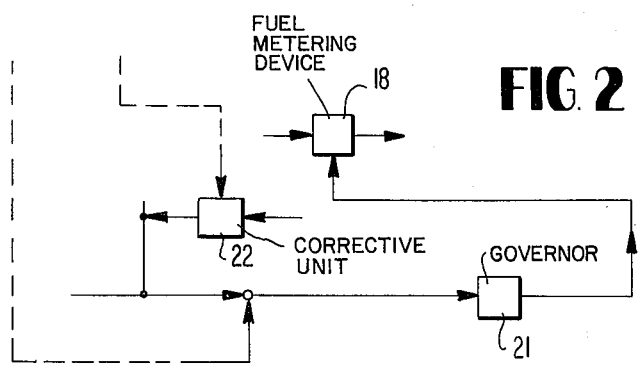
Figure 3:
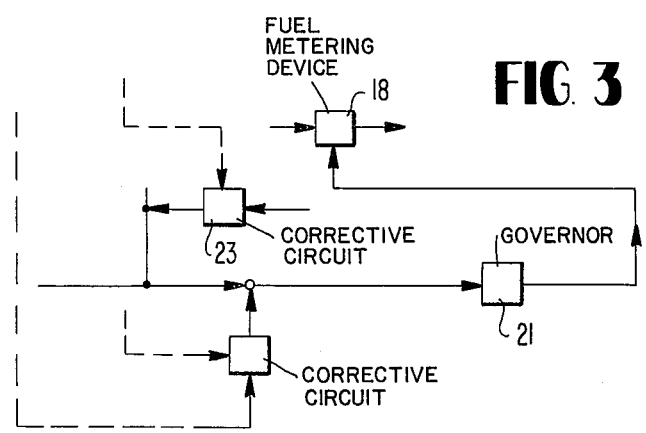

These and other objects features and advantages of the present invention will become more apparent from the following detailed description, when taken in conjunction with the accompanying drawings, which illustrate various embodiments of the invention, and wherein:

FIG. 1 is a block diagram illustrating an embodiment of the governing device arranged in accordance with this invention in connection with a vehicular gas turbine engine; and FIGS. 2 and 3 are block diagrams illustrating two alternative embodiments of the device arranged in accordance with this invention. These governing devices are each equally suited for use with the engine of FIG. 1.

The gas turbine engine in FIG. 1 is a two-spool system having a gas generator turbine 10 to drive a compressor 11 for the combustion air (with excess air) and a power turbine 12 having a variable stator nozzle 13 and delivering effective power through a gearbox 14. The engine further incorporates an air heater 15, a combustion chamber 16, a fuel pump 17 and a fuel metering device 18. The function of the engine will become readily apparent from FIG. 1, where arrowheads indicate the air flow and the gas flows. An arrowhead 19 indicates the fuel flow to the combustion chamber 16.

The fuel metering device 18 is under the control of the governing device. The governing device has a corrective circuit 20 receiving a signal representing the instantaneous value $N_i$ of the speed $N$ of the gas generator turbine 10. The corrective circuit 20, which is a typical servo control circuit, such as a magnetic amplifier, automatically varies the instantaneous value $N_i$ over the entire speed range as a function of a second received signal representing the inlet temperature $T_1$ of the engine. Thus, the regulating variable is the socorrected speed $N_{korr}$. Its instantaneous value is indicated by $N_{korr\ i}$, and its specified value by $N_{korr\ s}$ which is a function of the power lever angle $\alpha$, so that $N_{korr\ s} = f(\alpha)$. The governing device has an associated governor 21 of conventional type to vary the fuel flow in response to the output of the summing junction to which the signal $N_{korr\ s}$ and the output of the corrective circuit 20 are applied. This governing device serves to keep, at the prevailing power lever angle, the output of the power turbine 12 approximately constant over the entire speed range at various outside temperatures. In the same fashion, and this is not shown in FIG. 1, the specified value $N_s$ rather than the instantaneous value $N_i$ of this speed $N$ can be automatically varied as a function of this inlet temperature $T_1$.

The fuel metering device 18 can likewise be controlled by the governing device shown in FIG. 2. With this governing device the maximum value of the specified value of the said speed $N$, or $N_{s\ max}$, is automatically influenced or varied as a function of the said inlet temperature $T_i$ for limiting, for example, the output of the engine. This is achieved in a corrective circuit 22 of the governing device. The result of this change effected by the corrective circuit 22 is a maximum value of the specified value $N_s$, or $N_{s\ max}$, which is dependent on the inlet temperature $T_1$. The regulating variable here is the speed N. Its instantaneous value is indicated by $N_i$ and its specified value by $N_s = f(\alpha)$. The governing device incorporates an associated governor 21 of the same type provided in the system of FIG. 1.

The fuel metering device 18 can likewise be operated by the governing device shown in FIG. 3. This governing device performs two corrections in response to temperature. The governing device has a corrective circuit 20 for the instantaneous value $N_i$ and additionally a corrective circuit 23 for the maximum value of the specified value of the corrected speed, or $N_{Korr\ s\ max}$. At variance with FIG. 2 where the corrective circuit 22 limits a straight speed ($N_s$), FIG. 3 provides limitation of a $T_1$-corrected speed $N_{Korr\ s} = f(\alpha)$ to a corrected maximum speed $N_{Korr\ s\ max}$, which is formed by the corrective circuit 23 and dependent on $T_1$. This governing device likewise has an associated governor 21 of the said type (see FIGS. 1 and 2). The cited inlet temperatures $T_1$ and invariably total temperatures.

What we claim is:

1. A governing system for controlling the fuel flow to a gas turbine engine having a combustion chamber receiving compressed air from a compressor and fuel from a fuel metering device, comprising a governor providing a control signal to control said fuel metering device, means for generating a speed correction signal at constant turbine speed or power lever angle in response to the related values of engine speed and temperature at the inlet of said compressor, and a summing junction for summing said speed correction signal and a desired speed signal, the output of said summing junction being applied in control of said governor at constant turbine speed or power lever angle.

2. A governing system as defined in claim 1, wherein said means for generating said speed correction signal is responsive to the square root of said inlet temperature.

3. A governing system as defined in claim 1, wherein said engine speed to which said engine speed correction means is responsive is derived from the output shaft of said compressor.

4. A governing system as defined in claim 1, further including means for regulating said desired speed signal to less than a maximum value including correction means for varying said maximum value in proportion to the inlet temperature of said compressor.

5. A governing system as defined in claim 4, wherein said correction means varies said maximum value only below a selectived low level of inlet temperature.

6. A governing system for controlling the fuel flow to a gas turbine engine having a combustion chamber receiving compressed air from a compressor and fuel from a fuel metering device, comprising a governor providing a control signal to control said fuel metering device, a summing junction for summing signals representing engine speed and desired engine speed, the output of said summing junction being applied in control of said governor, and means for regulating said desired speed signal to less than a maximum value including correction means for varying said maximum value in response to the inlet temperature of said compressor at constant turbine speed or power lever angle.

7. A governing system as defined in claim 6, wherein said engine speed to which said engine speed correction means is responsive is derived from the output shaft of said compressor.

8. A governing system as defined in claim 6, wherein said correction means varies said maximum value only below a selected low level of inlet temperature.

* * * * *